United States Patent [19]

Seppamaki

[11] Patent Number: 4,735,130
[45] Date of Patent: Apr. 5, 1988

[54] FRESH AIR MAKE-UP APPARATUS

[76] Inventor: John W. Seppamaki, 3768 Socorro, Grandville, Mich. 49418

[21] Appl. No.: 930,346

[22] Filed: Nov. 12, 1986

[51] Int. Cl.$^4$ .............................................. F24F 13/04
[52] U.S. Cl. ..................................... 98/34.6; 98/38.1; 126/112; 237/46; 237/55
[58] Field of Search ...................... 98/34.6, 38.1, 38.9; 126/112; 237/46, 55; 165/901

[56] References Cited

U.S. PATENT DOCUMENTS

| | | | |
|---|---|---|---|
| 1,325,905 | 12/1919 | Parker | 126/116 R |
| 1,464,385 | 8/1923 | Hartzell | 237/53 |
| 1,726,727 | 9/1929 | Wood | 126/117 |
| 1,801,057 | 4/1931 | Samels | 237/55 |
| 2,755,794 | 7/1956 | Wendell | 237/55 |
| 2,962,218 | 11/1960 | Dibert | 237/55 |
| 3,198,190 | 8/1965 | Gordon | 126/117 |
| 4,175,538 | 11/1979 | McCarty | 126/112 |
| 4,194,688 | 3/1980 | Cobos | 126/112 |
| 4,285,325 | 8/1981 | Bellaff | 126/112 |
| 4,300,527 | 11/1981 | Montague | 165/901 |
| 4,364,514 | 12/1982 | Toporek | 165/901 |
| 4,462,385 | 7/1984 | Dragon | 165/901 |
| 4,558,689 | 12/1985 | McCann | 237/55 |

Primary Examiner—Albert J. Makay
Assistant Examiner—David W. Westphal
Attorney, Agent, or Firm—John A. Waters

[57] ABSTRACT

Fresh air make-up apparatus for a furnace located in an enclosed building comprises an elongated diffuser housing positioned adjacent the furnace, with the housing having an inlet in communication with fresh outside air and a pair of outlets, one being connected to the cold air return of a forced air furnace at a point substantially upstream of the heat exchanger, and the other outlet leading to the room. The outlet leading to the cold air return provides fresh make-up air for the building, while the opening leading to the room provides both a means for diffusing and preheating the fresh air supplied to the cold air return and a means for providing fresh air diffused with warm room air to the combustion in the combustion chamber of the furnace. The apparatus also includes a removable filter for removing contaminants from the fresh air. The apparatus can include a heat exchanger for preheating the fresh air with warm air from the warm air duct of the furnace. This warm air is then exhausted outside the building to provide a continuous air exchange within the building. The apparatus includes an elongated housing having an inlet at the upper end, a partition dividing the housing into upper and lower secctions, a first duct leading downwardly from an opening in the partition to an open end adjacent the bottom of the housing, a cold air duct extending sideways from the first duct at a position above the open end and leading to the cold air return, and a diffuser opening in the housing positioned above the open end of the first duct. The filter is positioned slightly above the partition and is removable through an access opening.

20 Claims, 2 Drawing Sheets

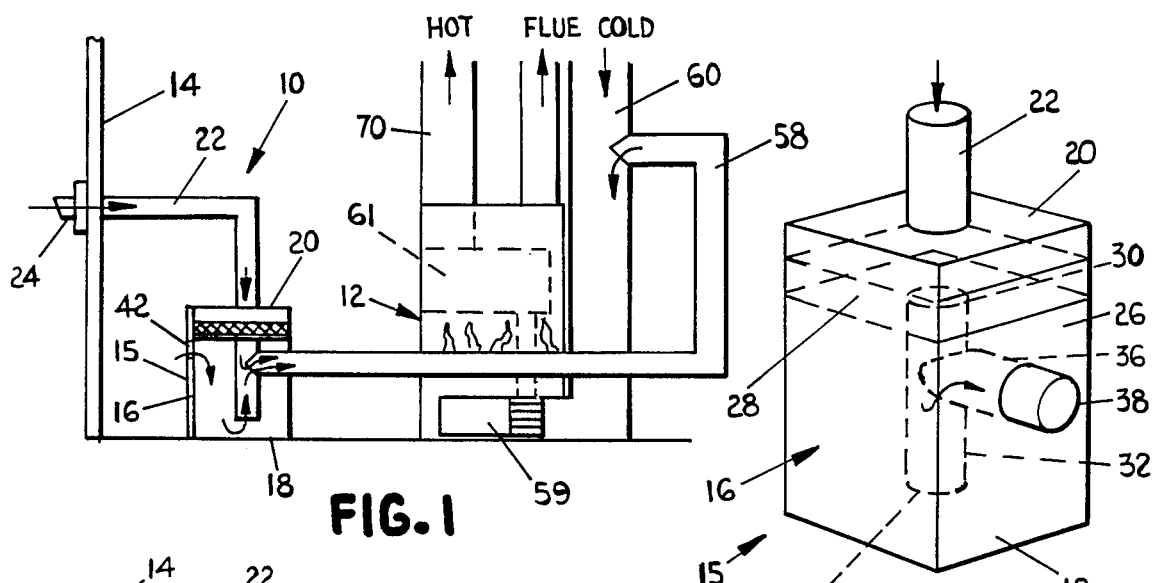
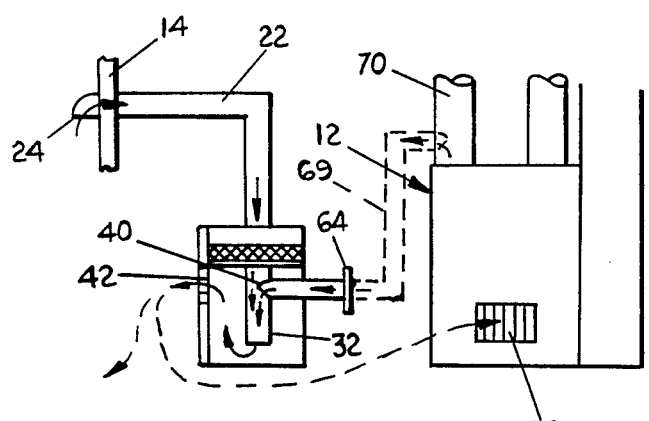
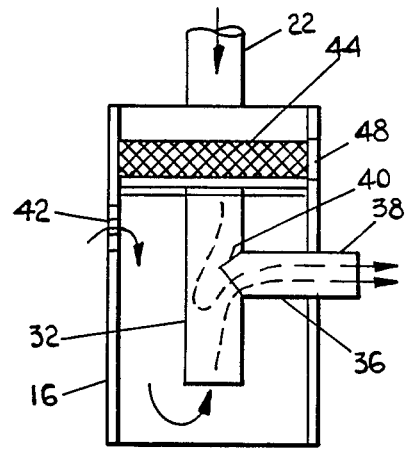
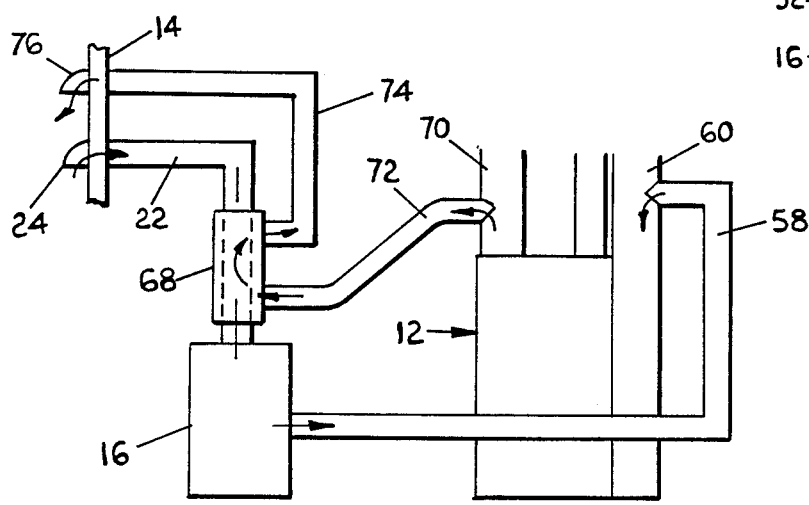

FRESH AIR MAKE-UP APPARATUS

BACKGROUND OF THE INVENTION

This invention relates to fresh air make-up apparatus for a furnace or the like and more particularly to apparatus that provides preheated and diffused fresh air for both the building and the furnace combustion chamber.

In a conventional forced air heating system employing a fuel burning furnace, such as a gas fired furnace, fuel is burned in a combustion chamber of the furnace and the heat from the combustion gases is transferred in a heat exchanger to building air that is circulated through the building. A furnace blower receives the building air from a cold air duct and returns the heated air to the building environment through a warm air duct. Exhaust gases are exhausted through a flue to the atmosphere after they have warmed the room air in the heat exchanger.

The movement of heated combustion gases up the flue and out of the building is one factor that causes a negative pressure in a building. This condition causes gases to be replaced in the building principally by seepage through natural openings, such as gaps around windows, doors, or the like. In highly insulated and well sealed houses, however, replacement air through natural openings of the house may be substantially unavailable. This can cause a number of problems. The combustion chamber of the furnace may operate less efficiently if a substantial negative pressure condition persists. If the negative pressure condition becomes acute, exhaust gases may actually be dumped back into the building through the draft diverter or draft hood of the furnace. Such gases can be lethal.

In addition, if air is continuously recirculated in a house without an exchange of some fresh air, the air becomes stale and can pick up a number of unhealthy and sometimes toxic contaminants.

Various devices have been developed for providing fresh outside air to the combustion chamber of a furnace. Most such devices provide the fresh cold air directly to the combustion chamber, which is undesirable. Others have released the fresh air to the room where the furnace is located as a means for heating and diffusing the air, while still others have preheated the outside air with a heat exchanger connected to the exhaust flue.

Other types of devices have been developed for providing a fresh air exchange in a tightly closed building. In one system, fresh air is preheated by the exhaust flue and then discharged into the cold air return of the furnace.

It is one of the objects of the present invention to provide an improved fresh air make-up apparatus that provides fresh air to both the room environment and to the combustion area of the furnace, while filtering, diffusing, and preheating the air in a compact unit.

SUMMARY OF THE INVENTION

Fresh air make-up apparatus for a furnace located in an enclosed building comprises an elongated diffuser housing positioned adjacent the furnace, with the housing having an inlet in communication with fresh outside air and a pair of outlets, one being connected to the cold air return of a forced air furnace at a point substantially upstream of the heat exchanger, and the other outlet leading to the room. The outlet leading to the cold air return provides fresh make-up air for the building, while the opening leading to the room provides both a means for diffusing and preheating the fresh air supplied to the cold air return and a means for providing fresh air diffused with warm room air to the combustion chamber of the furnace. The apparatus also includes a removable filter for removing contaminants from the fresh air. The apparatus can include a heat exchanger for preheating the fresh air with warm air from the warm air duct of the furnace. This warm air is then exhausted outside the building to provide a continuous air exchange within the building. The apparatus includes an elongated housing having an inlet at the upper end, a partition dividing the housing into upper and lower sections, a first duct leading downwardly from an opening in the partition to an open end adjacent the bottom of the housing, a cold air duct extending sideways from the first duct at a position above the open end and leading to the cold air return, and a diffuser opening in the housing positioned above the open end of the first duct. The filter is positioned slightly above the partition and is removable through an access opening.

The foregoing features and other features and objects of the present invention are described in detail below and shown in the appended drawings.

BRIEF DESCRIPTION OF THE DRAWINGS

FIG. 1 is a schematic pictorial view of a furnace system employing the fresh air make-up apparatus of the present invention.

FIG. 2 is a schematic pictorial view showing an embodiment of the present invention for supplying fresh air only to the room adjacent the furnace.

FIG. 3 is another embodiment of the present invention showing the use of a heat exchanger connected to the warm air duct of the furnace for preheating the fresh air.

FIG. 4 is a schematic view of the diffuser of the present invention.

FIG. 5 is a side elevational view of the diffuser of the present invention.

DETAILED DESCRIPTION OF THE PREFERRED EMBODIMENTS

Figure 6:
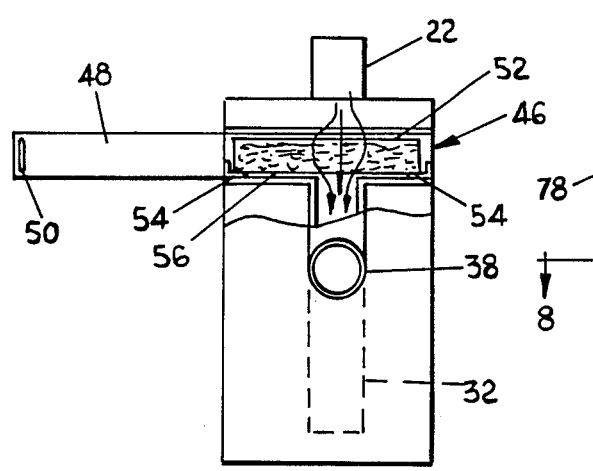
FIG. 6 is a front elevational view of the diffuser of the present invention, showing the filter access door in an opened positioned.

Referring to the drawings, fresh air make-up apparatus 10 is shown for exemplary purposes connected to a conventional gas or oil fired furnace 12 located within an enclosed building 14.

Fresh air make-up apparatus 10 comprises a diffuser 15 contained in a diffuser housing 16 positioned adjacent the furnace. Housing 16 is an elongated tubular member that rests on the floor on a lower end 18 and extends upwardly to an upper end 20. Upper end 20 is connected to a fresh air inlet duct 22 that leads to an inlet opening 24 exterior of the building.

Referring to FIG. 4, housing 16 desirably is a rectangular member having vertical sides 26 extending between upper and lower ends 20 and 18. A rectangular partition 28 separates the interior of the housing into upper and lower chambers, with an opening 30 in the partition providing communication between the chambers. A first duct 32 is connected to the underside of the partition at opening 30 and extends downwardly to a discharge point at an open lower end 34 positioned adjacent the bottom 18 of the housing. A furnace outlet duct 36 for fresh make-up air is positioned substantially above the lower end of duct 32 and extends outwardly from the side of duct 32 to an outlet collar 38 on the exterior of the housing. Duct 36 includes a flow deflecting baffle or hood or scoop 40 at the opening of duct 36 into duct 32. The baffle is positioned along the upper edge of duct 36 and extends in a downwardly and inwardly direction, causing incoming fresh air to be deflected downwardly past the inlet of duct 36. This incoming air is then drawn in an upward pattern as shown in FIG. 5 before it is conveyed out of the housing through collar 38. The deflector baffle prevents excessive fresh air flow through duct 36. When air flows into the diffuser through the furnace outlet duct (as described below) the baffle also acts as a venturi to direct the air flow downwardly through duct 32, drawing fresh air with it.

Housing 16 also includes a diffuser opening 42 in the side of the housing at a point substantially above the open lower end of the conduit 32, preferably in the upper portion of the housing adjacent the partition. Furnace room air flows into or out of the diffuser opening depending on the relative pressures in the furnace room, the interior of the diffuser housing, and the furnace outlet. When the pressure in the furnace room is more negative than the other pressures, fresh air flows into the lower chamber of the diffuser housing through conduit 32 and then flows upwardly and out of diffuser opening 42. This fresh air is admixed with warm room air before reaching the combustion chamber of the furnace, thus preventing the undesirable effects produced by directly introducing cold outside air into the combustion chamber of a furnace.

It is significant that diffuser opening 42 is positioned above the open lower end 34 of the duct 32. This construction provides an "air lock" in the diffuser housing that traps the cold air in the bottom of the housing until it is needed by the furnace, at which time it is drawn off the top of the air column in the diffuser housing. The position of the inlet to duct 36, which is also in an elevated position with respect to the open lower end of duct 32, serves the same purpose.

Another element included in the diffuser housing is a removable filter element 44 (see FIGS. 6 and 7) which is positioned above partition 28. Filter 44 can be a conventional filter (preferably a so-called hogs hair filter) for removing contaminants from fresh air being introduced into the system. This filter desirably is washable so that it can be removed, washed, and returned to the housing. Filter 44 is removable through an access opening 46 in the side of 26 of the housing. A closable access door 48 is employed for opening and closing the access opening. In the illustrated embodiment, access door 48 is a rectangular plate having a handle 50 that slides in channel retainers 52 on opposite sides of the access door.

The filter is mounted in the interior of the housing by means of angle brackets 54 on opposite sides of the housing. These brackets position the filter slightly above the surface of the partition. This serves a significant function, in that with the filter slightly above the partition, there is a narrow air chamber 56 between the bottom surface of the filter and the partition. This permits incoming air to flow into the interior of duct 32 through any portion of the filter. Thus, when the center of the filter becomes clogged, the air can circulate through the sides of the filter and then down into duct 32. If the filter were flat against the partition, air would be forced to flow through the center of the filter in order to flow into duct 32.

In the embodiment shown in FIG. 1, outlet collar 38 is connected to a duct 58 leading to the cold air return duct 60 of the furnace. Duct 58 is connected to the cold air return duct at a position substantially away from the heat exchanger of the furnace. This distance should be sufficient to permit the fresh cold air (already partially preheated and admixed with air drawn into the diffuser through the diffuser opening) to be admixed with the air in the cold air return and further preheated and diffused before it reaches the heat exchanger of the furnace. Cold moist air, coming in contact with the heat exchanger, could deteriorate or damage the heat exchanger. In practical applications of the present invention, connection of the fresh air duct 58 to the cold air return duct should be made at least one and one-half and preferably at least six feet away from the blower 59 of the furnace.

In operation, when furnace blower 59 is operating, this creates a negative pressure in the cold air return and draws fresh air through conduit 58. This supplies fresh air to the building and neutralizes the pressure in the building. The pressure in the cold air return generally is more negative than the pressure in the furnace room when the blower is operating, so this draws room air into the housing through diffuser opening 42 to diffuse and preheat the fresh air (see FIG. 5). This further reduces any adverse effects of introducing cold moist air into the furnace heat exchanger 61.

Fresh air will flow out of the diffuser opening into the room when the blower is not operating and, in addition, a relative negative pressure exists in the room.

In some installations, either the furnace does not have a cold air return (e.g., a hot water or steam furnace that does not use forced air) or it is not necessary to provide fresh air to the cold air return. In such a situation, a cap 64 is placed over collar 38 in the diffuser (see FIG. 2). With cap 64 in place, fresh air is admitted to the room only through diffuser opening 42, from which it travels through warm room air to combustion chamber inlet 66.

In a variation of this construction (shown in phantom in FIG. 2) instead of a cap 64 the furnace outlet of the diffuser is connected by a duct 69 leading to the warm air duct of the furnace. Since the warm air duct is downstream of the blower, it is charged with a positive pressure when the blower is operating. This causes a flow of warm air from warm air duct 70 through duct 69 and into the diffuser. Baffle or hood 40 acts as a flow director and venturi, urging the air to flow downwardly in duct 32, drawing fresh outside air with it. The fresh outside air is thus admixed with and warmed by the air from the warm air duct and is thereafter discharged into the room through the diffuser opening, heating and providing fresh air to the room.

Another variation of the present invention is shown in FIG. 3. In this embodiment, the system is the same as described above for FIG. 1 with the exception that a heat exchanger 68 is inserted in inlet conduit 22 upstream of the diffuser housing 16. Heat exchanger 68 is an air-to-air heat exchanger, with one supply of air being the fresh air passing through inlet conduit 22 and the other supply of air being warm air from the warm air duct 70 of the furnace. A portion of the warm air in duct 70 is conveyed through a warm air inlet duct 72 to the heat exchanger and then is exhausted from the heat exchanger by means of an exhaust duct 74 leading to an outlet 76 on the exterior of the building. The warm air from the warm air duct preheats the cold air in fresh air inlet 22 before it enters the diffuser housing 16. The warm air that is thus cooled is then exhausted from the building through outlet 76. The exhaustion of a portion of the warm air and the introduction of new fresh air through fresh air duct 58 into cold air return 60 provides a continuous air exchange of fresh air in the building. This prevents the build up of toxic elements in air that is continuously recycled.

Figure 7:
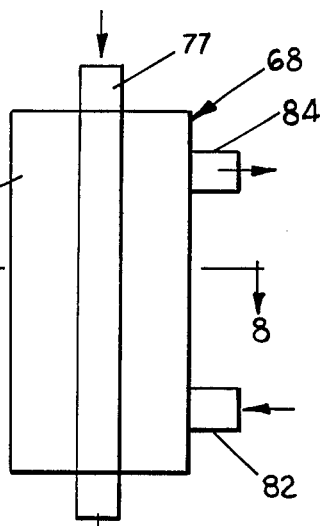
FIG. 7 is a view of one embodiment of a heat exchanger employed in the present invention.
Figures 8, 10:
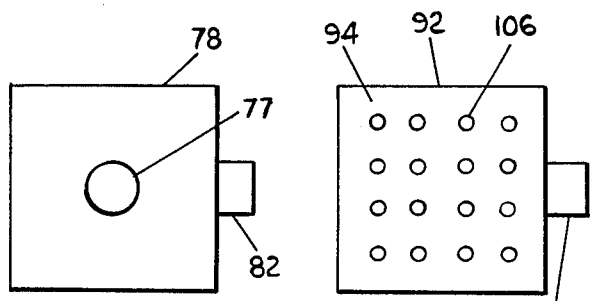
FIG. 8 is a view taken along line 8—8 of FIG. 7.
FIG. 10 is a view taken along line 10—10 of FIG. 9.

Several types of heat exchangers are shown in FIGS. 7-12. In FIGS. 7 and 8, heat exchanger 68 comprises a cylindrical center duct 77 surrounded by a rectangular outer shell 78 providing an air space there between. An inlet 82 for warm air is positioned at one end of the shell 78 and an outlet 84 is positioned at the other end of the shell.

Figure 9:
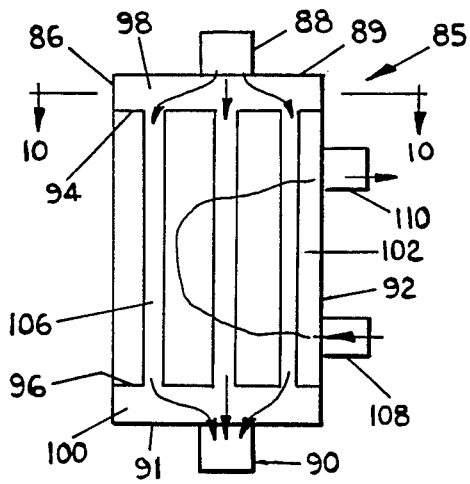
FIG. 9 is another embodiment of a heat exchanger employed in the present invention.

A more efficient type of heat exchanger is shown in FIGS. 9 and 10. In this embodiment, heat exchanger 85 comprises an elongated tubular rectangular outer shell 86 having an inlet 88 at one end 89 and an outlet 90 in the other end 91, with side walls 92 interconnecting the ends. A pair of partitions 94 and 96 are positioned adjacent each end of the outer shell so as to create air chambers 98 and 100 adjacent the inlet and outlet respectively and to separate these air chambers from a center air chamber 102 between the partitions. The partitions are provided with a number of aligned openings 104, and hollow tubular conduits 106 extend between the openings. The conduits provide an air flow passage between the chambers 98 and 100, while still isolating the central portion of the housing adjacent the outer sides of the tubes from the air passing from inlet 88 to outlet 90.

The central portion of the housing is provided with an inlet 108 at one end and an outlet 110 at the other end for conveying air from the warm air duct through the central portion of the housing. The warm air heats the cold outside air as it passes through tubes 106.

Figure 11:
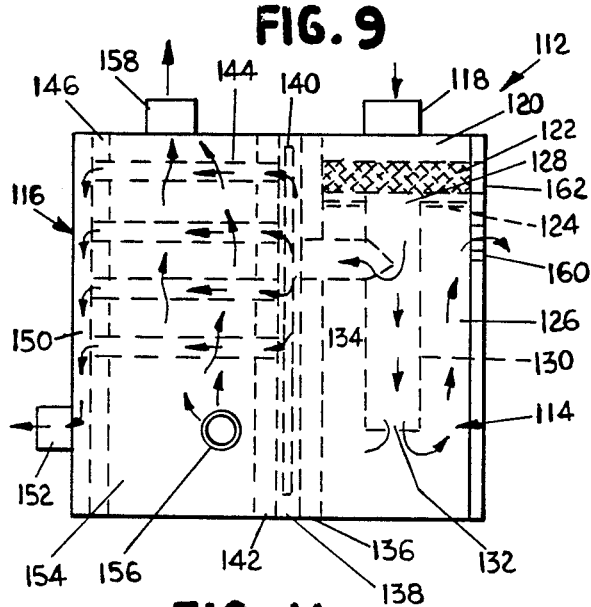
FIG. 11 is another embodiment of the invention in which a heat exchanger is incorporated into the diffuser housing.

Another embodiment of the fresh air make-up device of the present invention is shown in FIG. 11. In this embodiment, a single combination housing 112 includes a diffuser unit 114 and a heat exchanger 116 mounted side by side. The diffuser unit is substantially the same construction as diffuser unit 15 and includes an inlet 118 into a chamber 120 at the upper portion of the housing. A filter 122 is positioned at the bottom of chamber 120 slightly above a partition 124 which separates the upper chamber 120 from a lower chamber 126. An opening 128 in the partition provides communication between the two chambers, and a first duct 130 extends downwardly from the opening in the partition to an open lower end 132. A furnace duct 134 extends outwardly from the side of duct 130 from a position above the bottom and preferably close to the upper portion of duct 130. Duct 134 has an outlet in a vertical interior partition 136 into an air space 138 between the heat exchanger 116 and diffuser unit 114. The air space can incorporate a water to air heat exchanger 140, if desired, with the heat for the water being provided by a solar cell or by a waste heat furnace heated by the furnace flue. This heat exchanger is optional. Another partition 142 is positioned about three inches away from partition 136. This partition has a plurality of openings therethrough and these openings lead to the interior portions of tubes 144 mounted in communication with the interior of these openings. The tubes extend to another partition 146 and are mounted over corresponding aligned openings 148 in partition 146. These openings lead to an air chamber 150 (which preferably is at least three inches wide), and the air chamber then communicates with an outlet opening 152. A central portion of the heat exchanger 154 is positioned between partitions 142 and 146. This central portion is isolated from air chambers 138 and 150 and from the interior portions of tubes 144. Air is circulated through central portion 154 by means of an inlet 156 at the bottom of housing 112 and an outlet 158 in the top of the housing.

Vent openings 160 to the room provide a diffuser opening in the housing. The filter can be removed through a removable filter door 162. The pre-filter preferably is a so-called hogs hair filter, which is effective in removing particulate impurities from the incoming air.

The combination unit is connected to the furnace system in the following manner. Inlet 118 is connected to fresh air inlet conduit 22. Outlet 152 is connected to cold air return duct 58. Heat exchanger inlet 156 is connected to warm air conduit 72. Heat exchanger outlet 158 is connected to stale air exhaust 74 (see FIG. 3 for these components).

In operation, cold air enters inlet 118, passes through filter 122 and into lower chamber 126 through conduit 130. The cold air tends to sink to the bottom of the chamber when the furnace blower is off and when the pressure inside the building is neutral. The air trap effect of the diffuser unit prevents cold air from leaking into the room when the cold air is not required for furnace operations.

If the furnace burner is operated when the blower is off and a negative pressure develops in the room in which the furnace is located, fresh air will be drawn through opening 160 to the furnace combustion chamber to neutralize the pressure in the room and provide fresh air for the combustion process. Whenever the furnace blower is operating, the pressure in the cold air return is more negative than the pressure in the room. Thus, fresh air will be drawn through conduit 134 and heat exchanger 116 and then to the cold air return through outlet 152. The negative pressure caused by the cold air return will also cause air to be drawn into chamber 126 through opening 160. Thus, warm room air will be drawn into chamber 126, admixed with fresh air and warmed diffused fresh air will be passed through conduit 134 into the heat exchanger, where the air is further warmed. The opening 160 in the housing thus provides the dual function of serving as a means for supplying fresh air for the combustion process when the blower fan is not operating and a means for admixing preheated warm air with cold outside air before the air is provided to the cold air return.

The heat exchanger in the combination unit is also heated by the air from the warm air duct. This air is passed over the outsides of tubes 144 and then exhausted from the building so as to provide an air exchange in the building.

Figure 12:
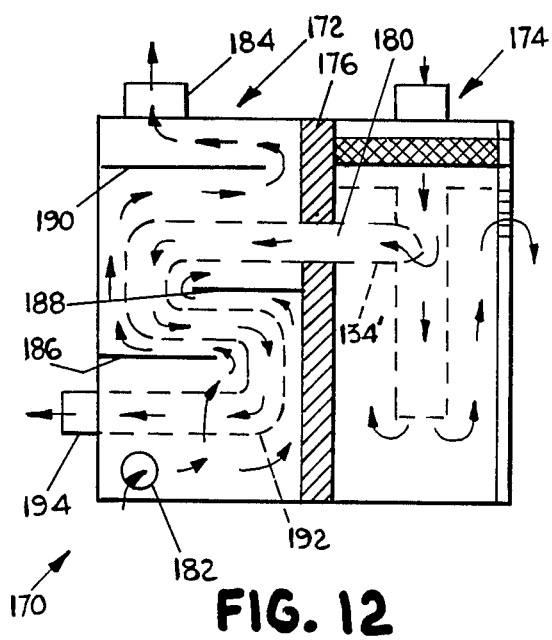
FIG. 12 is another embodiment of the invention in which a different heat exchanger is incorporated into the diffuser housing.

A modified version of the combination unit is shown in FIG. 12. In this figure the diffuser unit is the same as the unit shown in FIG. 11, but the construction of the heat exchanger portion is somewhat different. In combination unit 170, a housing 172 includes a diffuser unit 174 as described as above, with a single partition 176 separating the diffuser unit from the heat exchanger section 178. A single opening 180 in partition 176 provides communication between duct 134′ and the heat exchanger unit.

The heat exchanger unit 178 has an inlet 182 at the lower end and an outlet 184 at an upper end, with both inlet and outlet being positioned at an end of the housing spaced away from partition 176. Warm air from the warm air duct is introduced in inlet 182 and is exhausted through outlet 184. This air is forced to pass in an S-shaped pattern by alternating baffles 186, 188, and 190 which form an S-shaped path through the heat exchanger. Fresh air is conveyed along this S-shaped path through a conduit 192 having its inlet connected to opening 180 and its outlet connected to an outlet 194 at the lower left hand end of the housing. Outlet 194 is then connected to duct conduit 58 in the manner describe above. This apparatus functions in a similar manner to the heat exchanger described above.

It should be understood that the foregoing are merely preferred embodiments of the present invention and that other embodiments and modifications of the construction shown and described herein may be made within the spirit and scope of the present invention.

The embodiments of the invention in which an exclusive property or privilege is claimed are defined as the following:

1. Fresh air make-up apparatus for a forced air furnace located in a building wherein the furnace includes a cold air return duct, a warm air duct and a blower, the fresh air make-up apparatus comprising:
   an enclosed diffuser housing having upper and lower ends and sides and having an open interior, the housing being positioned adjacent the furnace;
   a fresh air inlet at the upper end of the housing that is connected by means of a duct to a source of fresh air exterior of the building;
   first duct located inside the housing and having inlet means for receiving the fresh air admitted into the housing through the fresh air inlet, the first duct extending to an open lower end adjacent the lower end of the housing, such that the fresh air conveyed from the fresh air inlet by the first duct is discharged into the interior of the housing through the open lower end of the first duct;
   a furnace duct connected into the side of the first duct at a point above the open lower end of the first duct, the furnace duct leading to an outlet in the diffuser housing that is in turn connected to a cold air return duct of the furnace to provide supplemental fresh air to the interior of the building through the cold air return duct; and
   a diffuser opening in the housing at a position above the open lower end of the first duct but being in communication with the open lower end of the first duct, the housing and diffuser opening being positioned with respect to the furnace such that fresh air can be drawn as needed from the diffuser housing to the furnace combustion chamber, with the fresh air being sufficiently warmed and admixed with room air as it passes from the diffuser opening to the furnace that the undesirable effects of introducing cold outside air into the furnace combustion chamber are minimized;
   the diffuser housing, with the position of the outlet duct and diffuser opening being higher than the open lower end of the first duct, serving as an air lock to retain cold fresh air in the housing until drawn out of the housing by a relatively negative pressure in the building or in the cold air return, air from the building flowing into the diffuser opening and being admixed with fresh air conveyed to the cold air return when the furnace blower is operating, fresh air being available to flow out of the diffuser opening to balance negative pressure and augment furnace combustion when the furnace blower is not operating.

2. Fresh air make-up apparatus according to claim 1 wherein:
   a partition divides the housing into upper and lower two chambers, the upper chamber being in communication with the fresh air inlet and the other chamber being separated from the fresh air inlet, the partition having an opening therein connecting the two chambers;
   a removable filter is positioned between the fresh air inlet and the partition, the filter being constructed for removal of contaminants from the fresh air passing through the diffuser housing;
   the housing includes a closable access opening through which the filter can be removed for cleaning or replacement; and
   the inlet means of the first duct is mounted to a lower side of the partition over the opening therein and extends downwardly therefrom.

3. Fresh air make-up apparatus according to claim 1 wherein the diffuser housing and an air-to-air heat exchanger are mounted in a combination housing, with the heat exchanger having two air pathways, one receiving fresh air from the furnace outlet from the diffuser housing and transmitting the air to the cold air return duct after it passes through the heat exchanger, and the other pathway receiving warm air from the warm air duct of the furnace and transmitting it to an exhaust outlet exterior of the building after it passes through the heat exchanger.

4. Fresh air make-up apparatus for a furnace located in a building comprising:
   an enclosed diffuser housing having upper and lower ends and sides and having an open interior, the housing being positioned adjacent the furnace;
   a fresh air inlet at the upper end of the housing that is connected by means of a duct to a source of fresh air exterior of the building;
   a partition dividing the housing into two vertically spaced chambers, an upper chamber being in communication with the fresh air inlet and a lower chamber being separated from the fresh air inlet, the partition having an opening therein connecting the two chambers;
   a removable filter positioned between the fresh air inlet and the partition, the filter being constructed for removal of contaminants from the fresh air passing through the diffuser housing;
   a closable access opening in the housing through which the filter can be removed for cleaning or replacement;

a first duct having an inlet connected to the opening in the partition and extending downwardly to an open end adjacent the lower end of the housing;

a furnace duct connected into the side of the first duct above the lower end thereof and extending to a furnace outlet opening in the housing, the furnace outlet opening being closable or connectable with a cold air return duct of the furnace to provide supplemental fresh air to the interior of the building; and a diffuser opening in the lower chamber of the housing at a position above the lower end of the first duct, such that the housing provides an air lock that restricts cold fresh air from leaking from the diffuser opening unless needed to neutralize a negative presser in the building, the diffuser opening permitting warm room air to be drawn into the stream of fresh air conveyed to the cold air return duct to diffuse and preheat the fresh air, the diffuser opening also permitting fresh air to flow out of the diffuser housing to neutralize pressure adjacent the furnace and provide fresh air for combustion.

5. Fresh air make-up apparatus according to claim 4 wherein the furnace is a forced air furnace having a blower that draws air from a cold air return duct, heats the air in a furnace heat exchanger, and returns the air through a warm air duct, the apparatus further comprising a duct leading from the furnace outlet of the diffuser housing to the cold air return duct of the furnace system, the duct being connected to the cold air return duct at a position upstream from the furnace heat exchanger by a distance such that cold fresh air will be admixed with and warmed by the air in the cold air return duct sufficiently to avoid undesirable effects when the air reaches the furnace heat exchanger.

6. Fresh air make-up apparatus according to claim 5 and further comprising a fresh air inlet duct leading from the exterior of the building to the fresh air inlet of the diffuser housing, the inlet duct including a heat exchanger therein having an inlet and outlet for air from another source to exchange heat with the fresh air, the second inlet being connected by a duct to the warm air duct of the furnace, the second outlet being connected by a duct to an exhaust outlet leading to the exterior of the building, a portion of the warmed air in the warm air duct first serving to preheat the incoming cold fresh air in the heat exchanger and thereafter being exhausted from the building to provide an air exchange in the building, with preheated fresh air being admitted through the fresh air make-up apparatus and stale air being exhausted from the warm air duct to the exhaust outlet.

7. A fresh air make-up apparatus according to claim 6 wherein the heat exchanger comprises an elongated tubular housing having an inlet and outlet at opposite ends that are connected into the fresh air inlet duct, partitions being positioned adjacent each end of the housing so as to isolate a center portion of the housing from the inlet and outlet, aligned openings being formed in the partition, tubular conduits being connected between the openings such that fresh air can pass from the inlet to the outlet through the tubular conduits, with the portion of the center portion of the housing surrounding the tubular conduits being isolated from the fresh air, the second inlet and outlet connected to the warm air duct and exhaust outlet being connected to the center portion of the housing, such that air from the warm air duct passes over the outer sides of the tubular conduits as it passes through the housing, thereby preheating the fresh air as it passes through the tubular conduits.

8. A fresh air make-up apparatus according to claim 5 wherein the furnace duct extends from a side of the first duct at a position above the lower end thereof and exits from the side of the housing, the furnace duct including a baffle where the duct joins the first duct, the baffle being at an upper side of the furnace duct and protruding into the first duct, the baffle inducing air to first flow downwardly past the inlet into the furnace duct and then upwardly to the furnace duct inlet.

9. Fresh air make-up apparatus according to claim 5 wherein the duct is connected to the cold air return duct at least one and one-half feet upstream from the furnace blower.

10. A fresh air make-up apparatus according to claim 4 wherein the furnace is a forced air furnace having a blower that draws air from a cold air return and discharges the air through a heat exchanger and into a warm air duct, the furnace duct being connected by a duct to the cold air return duct of the furnace at least six feet upstream of the furnace blower.

11. Fresh air make-up apparatus for a forced air furnace located in a room in a building wherein the furnace has a blower that draws cool air through a cold air return duct and blows the air through a heat exchanger to a warm air outlet duct, the fresh air make-up apparatus comprising:

a fresh air inlet duct that conveys fresh air from outside the building into the building;

a diffuser positioned adjacent the furnace and having diffuser inlet means for receiving the fresh air from the fresh air inlet duct, the diffuser having two outlets, one being a diffuser outlet leading to the interior of the room in which the furnace is located, and another outlet being a furnace outlet that is connected to the cold air return duct of the furnace, the diffuser further having gravity operated air lock means for restricting the passage of cold fresh air out of the diffuser except when negative pressure in the building or cold air return duct indicates a need for the fresh air, the diffuser outlet and furnace outlet being in fluid communication such that when there is a relatively lower pressure at the furnace outlet, causing fresh air to be conveyed out the furnace outlet, room air is drawn into the diffuser through the diffuser outlet and admixed with the fresh air conveyed out the furnace outlet, warming and diffusing the air; and furnace duct means for conveying fresh air from the furnace outlet of the diffuser to the cold air return duct of the furnace, the furnace duct means being connected into the furnace cold air return duct at a point sufficiently upstream of the furnace heat exchanger to restrict damage to the heat exchanger by contact with cold fresh air before it is preheated and diffused with room air or air in the cold air return duct.

12. Fresh air make-up apparatus according to claim 11 wherein the diffuser comprises an elongated, enclosed diffuser housing extending upwardly from a lower end to an upper end, with sides interconnecting the ends, the diffuser inlet means being formed in the housing and including means for delivering the fresh air to a discharge point in the lower portion of the housing, the diffuser and furnace outlets being formed in the housing, the diffuser outlet being positioned in the housing at a position above the discharge point such that the housing acts as the air lock means.

13. Fresh air make-up apparatus according to claim 12 wherein the diffuser inlet means is formed in an upper portion of the housing and the means for conveying fresh air to the lower portion of the housing includes a first duct located in the housing and having inlet means for receiving the air admitted into the inlet, the duct extending downwardly to an outlet in the lower portion of the housing, the outlet being the discharge point, the furnace outlet being a furnace duct leading from a furnace duct inlet in the first duct inside the housing to an outlet in the housing, the furnace duct inlet being positioned above the first duct outlet such that the diffuser acts as the air lock means, operation of the furnace blower producing a relatively negative pressure in the cold air return duct, which in turn draws fresh air from the diffuser and draws room air into the diffuser outlet and into the stream of fresh air conveyed to the cold air return duct, preheating and diffusing such air, the diffuser outlet operating in reverse to provide fresh air from the diffuser to the room adjacent the furnace when the furnace blower is not operating and the pressure inside the building adjacent the furnace is negative relative to the inlet to the fresh air inlet duct on the exterior of the building.

14. Fresh air make-up apparatus according to claim 13 wherein the housing comprises a partition in the interior of the housing dividing the housing into upper and lower chambers, the fresh air inlet being positioned in the upper chamber at the upper end of the housing, the housing outlets being in the lower chamber, the partition having an opening therein for providing communication between the chambers, the first duct having its inlet mounted on an underside of the partition over the opening therein, the apparatus further including filter means for filtering the fresh air entering the diffuser, filter means being a filter positioned over the partition between the fresh air inlet and the partition opening, the housing having a closeable access opening leading to the filter and the filter being removable for replacement or cleaning through the access opening.

15. Fresh air make-up apparatus according to claim 11 and further comprising air-to-air heat exchange means for preheating the fresh air with warm air from the warm air duct before it is introduced into the cold air return duct of the furnace.

16. Fresh air make-up apparatus according to claim 15 wherein the air-to-air heat exchanger means is a heat exchanger having isolated passageways for air from two sources with each passageway having an inlet and outlet for transmitting air therethrough, the inlet and outlet for one source being connected to receive and discharge fresh air, the inlet for the other source being connected to receive warm air from the warm air duct of the furnace, the outlet for said other source being vented to a discharge point outside of the building, so as to provide a continuous exchange of fresh air for stale air in the building while preheating the fresh air with warm air from the warm air duct.

17. Fresh air make-up apparatus according to claim 16 wherein the heat exchanger and diffuser are mounted together in a combination housing that is positioned adjacent the furnace, the combination housing including the diffuser in one side and the heat exchanger in another side, a partition dividing the sides, the furnace outlet opening being formed in the partition and the inlet to the heat exchanger being in communication with the furnace duct, the outlet to the heat exchanger being connected to the furnace duct.

18. Fresh air make-up apparatus according to claim 17 wherein the combination housing includes a pair of substantially parallel interior partitions spaced apart, with the furnace outlet from the diffuser being connected to one of the partitions and the fresh air inlet to the heat exchanger being connected to the other partition, the combination housing including an auxiliary heat exchanger means in the space between the partitions employing heated fluid from another source for further preheating the fresh air.

19. Fresh air make-up apparatus according to claim 11 and further comprising filter means for filtering the fresh air before it is introduced into the cold air return duct of the furnace.

20. Fresh air make-up apparatus for a forced air furnace located in a room in a building wherein the furnace has a blower that draws cool air through a cold air return duct and blows the air through a heat exchanger to a warm air outlet duct, the fresh air make-up apparatus comprising:

a fresh air inlet duct that conveys fresh air from outside the building into the building;

a diffuser positioned adjacent the furnace and having diffuser inlet means for receiving the fresh air from the fresh air inlet duct, the diffuser having a diffuser outlet leading to the interior of the room in which the furnace is located, the diffuser also having a furnace inlet that is connected to the warm air duct of the furnace, the diffuser further having gravity operated air lock means for restricting the passage of cold fresh air out of the diffuser except when negative pressure in the building is more negative than the pressure in the diffuser, the diffuser outlet and furnace inlet being in fluid communication such that when the pressure in the building is lower than the pressure in the warm air duct, air flows into the diffuser from the furnace inlet and then into the building through the diffuser outlet, the furnace inlet including venturi means for drawing fresh air into the diffuser through the diffuser inlet means as air flows into the diffuser through the furnace inlet, the warm air from the warm air duct thus being admixed with the fresh air before it is conveyed out the diffuser outlet, providing warmed and diffused fresh air to the room; and furnace duct means for conveying warm air from the warm air duct to the furnace inlet of the diffuser at least when the furnace blower is operating.

* * * * *